United States Patent
Tanabe (10) Patent No.: US 9,434,436 B1
(45) Date of Patent: Sep. 6, 2016

(54) REAR STRUCTURE FOR SADDLE-RIDE TYPE VEHICLE

(71) Applicant: HONDA MOTOR CO., LTD., Tokyo (JP)

(72) Inventor: Gen Tanabe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/009,124

(22) Filed: Jan. 28, 2016

(30) Foreign Application Priority Data

Feb. 25, 2015 (JP) ................................. 2015-034945

(51) Int. Cl.
| | |
|---|---|
| *B62K 11/02* | (2006.01) |
| *B62J 23/00* | (2006.01) |
| *B62J 1/04* | (2006.01) |
| *B62J 15/00* | (2006.01) |

(52) U.S. Cl.
CPC ........ *B62J 23/00* (2013.01); *B62J 1/04* (2013.01); *B62J 15/00* (2013.01)

(58) Field of Classification Search
CPC ............ B62J 23/00; B62J 1/04; B62J 15/00; B62J 15/02; B62D 25/16; B62D 25/18
USPC ............................. 280/281.1, 152.2; 296/198
See application file for complete search history.

(56) References Cited

U.S. PATENT DOCUMENTS

| | | | | |
|---|---|---|---|---|
| 4,485,884 A * | 12/1984 | Fukunaga | ............... | B62K 19/48 180/219 |
| 6,695,330 B2 * | 2/2004 | Hata | ...................... | B62K 11/00 180/219 |
| 8,317,212 B2 * | 11/2012 | Kobayashi | ............... | B62J 15/00 180/219 |
| 2009/0001705 A1 * | 1/2009 | Fischer | .................... | B62J 15/00 280/854 |
| 2010/0194149 A1 * | 8/2010 | Yamamoto | ............... | B62J 15/00 296/198 |
| 2013/0313861 A1 * | 11/2013 | Koyama | .................. | B62J 15/00 296/198 |
| 2014/0062058 A1 * | 3/2014 | Tsutsui | ...................... | B62J 6/18 280/281.1 |
| 2014/0167452 A1 * | 6/2014 | Nakagawa | ............... | B62J 15/00 296/198 |
| 2015/0042064 A1 * | 2/2015 | Tokumura | .............. | B62K 11/04 280/283 |
| 2015/0274213 A1 * | 10/2015 | Rudwal | .................. | B62D 25/18 280/154 |

FOREIGN PATENT DOCUMENTS

JP        2014-046858        3/2014

* cited by examiner

*Primary Examiner* — Tony Winner
(74) *Attorney, Agent, or Firm* — Rankin, Hill & Clark LLP (57) ABSTRACT

A rear structure for a saddle-ride type vehicle includes a rear fender made of resin and configured to cover an upper side of a rear wheel the vehicle. The rear fender includes: a bottom portion facing the rear wheel; a first side portion extending upward integrally from each of left and right end portions of the bottom portion; and a bending portion formed integrally with the bottom portion to be bendable at a hinge portion provided therebetween, and configured to be bent and stood upright from the bottom portion, and joined to the first side portion to form a second side portion. Since the second side portion is formed by bending and standing the bending portion from the bottom portion, and joining the bending portion to the first side portion, there is no need to engage a tip end of the bending portion with the bottom portion.

20 Claims, 7 Drawing Sheets

REAR STRUCTURE FOR SADDLE-RIDE TYPE VEHICLE

BACKGROUND OF THE INVENTION

1. Field of the Invention

The present invention relates to a rear structure for a saddle-ride type vehicle.

2. Description of Related Art

As a rear structure for a saddle-ride type vehicle, as seen in Japanese Patent Application Publication No. 2014-46858, for example, there is a conventionally known rear structure for a saddle-ride type vehicle, including a rear fender (10) made of resin and configured to cover an upper side of a rear wheel of a saddle-ride type vehicle, in which the rear fender (10) includes: a bottom portion (13); and a pair of left and right sidewall portions (15L, 15R) formed in the bottom portion (13) to be bendable, and tip end portions (37L, 37R) of the sidewall portions (15L, 15R) are engaged with the bottom portion (13).

Such a structure makes it possible to facilitate the manufacture of a rear fender.

Since the above-described conventional rear structure for a saddle-ride type vehicle is a structure in which the tip end portions (37L, 37R) of the sidewall portions (15L, 15R) are engaged with the bottom portion (13), a space on the bottom portion cannot be effectively utilized.

SUMMARY OF THE INVENTION

An object of the present invention is to provide a rear structure for a saddle-ride type vehicle, which makes it possible to effectively utilize a space on a bottom portion of a rear fender.

To achieve the above-described object, a rear structure for a saddle-ride type vehicle according to a first aspect of the invention is a rear structure for a saddle-ride type vehicle, including a rear fender made of resin and configured to cover an upper side of a rear wheel of a saddle-ride type vehicle, in which the rear fender includes a bottom portion configured to face the rear wheel; a first side portion extending upward integrally from each of left and right end portions of the bottom portion; and a bending portion formed integrally with the bottom portion to be bendable at a hinge portion provided therebetween, and configured to be bent and stood upright from the bottom portion, and joined to the first side portion to form a second side portion.

According to the rear structure for a saddle-ride type vehicle of the first aspect, since the second side portion is formed by bending and standing the bending portion from the bottom portion, and joining the bending portion to the first side portion, there is no need to engage a tip end of the bending portion with the bottom portion. This thus makes it possible to effectively utilize a space on the bottom portion of the rear fender.

A rear structure for a saddle-ride type vehicle according to a second aspect is the rear structure for a saddle-ride type vehicle according to the first aspect, in which a height of the second side portion extending upward from the hinge portion is larger than a height of the first side portion.

According to the rear structure for a saddle-ride type vehicle of the second aspect, in the rear structure for a saddle-ride type vehicle of the first aspect, since the height of the second side portion extending upward from the hinge portion is larger than the height of the first side portion, it is possible to manufacture the second side portion, which is a portion higher than the bottom portion, in a state where the second side portion is developed relative to the bottom portion through the hinge portion, and it is also possible to form the first side portion, which is a portion lower than the bottom portion, such that the first side portion protrudes upward from the bottom portion. This makes it possible to reduce the size of a manufacturing device.

A rear structure for a saddle-ride type vehicle according to a third aspect is the rear structure for a saddle-ride type vehicle according to the first or second aspect, in which the bottom portion includes a recess portion depressed upward along an outer shape of the rear wheel, and a height of the first side portion is smaller than or equal to a maximum height of the recess portion.

According to the rear structure for a saddle-ride type vehicle of the third aspect, in the rear structure for a saddle-ride type vehicle of the first or second aspect, since the bottom portion includes the recess portion depressed upward along an outer shape of the rear wheel, and the height of the first side portion is smaller than or equal to the maximum height of the recess portion, it is possible to avoid an increase in the size of a forming mold.

A rear structure for a saddle-ride type vehicle according to a fourth aspect is the rear structure for a saddle-ride type vehicle according to any one of the first to third aspects, in which a joint portion where the first side portion and the second side portion are joined together is formed by partially overlapping the first side portion and the second side portion in a vehicle-width direction, and the joint portion is covered with a cover member from an outer side in the vehicle-width direction.

According to the rear structure for a saddle-ride type vehicle of the fourth aspect, in the rear structure for a saddle-ride type vehicle of any one of the first to third aspects, since the joint portion where the first side portion and the second side portion are joined together is formed by partially overlapping the first side portion and the second side portion in the vehicle-width direction, and the joint portion is covered with the cover member from the outer side in the vehicle-width direction, it is possible to prevent water and the like from entering through the joint portion while simplifying the structure of the joint portion.

A rear structure for a saddle-ride type vehicle according to a fifth aspect is the rear structure for a saddle-ride type vehicle according to any one of the first to fourth aspects, in which an upper portion of the second side portion is fastened and fixed together with the first side portion to a vehicle-body frame by a fastening member.

According to the rear structure for a saddle-ride type vehicle of the fifth aspect, in the rear structure for a saddle-ride type vehicle of any one of the first to fourth aspects, since the upper portion of the second side portion is fastened and fixed together with the first side portion to the vehicle-body frame by the fastening member, it is possible to reliably prevent the first side portions and the second side portion from inclining relative to the bottom portion.

A rear structure for a saddle-ride type vehicle according to a sixth aspect is the rear structure for a saddle-ride type vehicle according to any one of the second to fifth aspects, in which an electrical component is fixed to the bottom portion near the hinge portion.

According to the rear structure for a saddle-ride type vehicle of the sixth aspect, in the rear structure for a saddle-ride type vehicle of any one of the second to fifth aspects, since the electrical component is fixed to the bottom portion near the hinge portion, the electrical component is fixed to the bottom portion near the hinge portion, which is at a lower position in the rear fender, making it possible to lower the center of gravity of the vehicle.

A rear structure for a saddle-ride type vehicle according to a seventh aspect is the rear structure for a saddle-ride type vehicle according to any one of the first to sixth aspects, in which the rear fender is disposed below a seat for a rider to be seated, a through-hole configured to connect an inside and an outside of the rear fender is provided in the second side portion, and a key cylinder constituting a part of a lock mechanism for the seat is inserted through the through-hole.

According to the rear structure for a saddle-ride type vehicle of the seventh aspect, in the rear structure for a saddle-ride type vehicle of any one of the first to sixth aspects, since the rear fender is disposed below the seat for the rider to be seated, the through-hole configured to connect the inside and the outside of the rear fender is provided in the second side portion, and the key cylinder constituting a part of the lock mechanism for the seat is inserted through the through-hole, it is possible to form the through-hole for the key cylinder simultaneously when manufacturing the rear fender without using a special mold.

BRIEF DESCRIPTION OF THE DRAWINGS

These and further features of the invention will be apparent with reference to the following description and drawings, wherein.

DETAILED DESCRIPTION OF THE INVENTION

Hereinafter, an embodiment of a rear structure of a saddle-ride type vehicle according to the present invention will be described with reference to the drawings. Note that the drawings should be seen in the direction of reference numerals. In the following description, front and rear, left and right, as well as up and down conform to the directions to be seen from a driver, and front, rear, left, right, up, and down of the vehicle are denoted respectively by Fr, Rr, L, R, U, and D in the drawings as necessary. In each of the drawings, the same portions or corresponding portions are denoted by the same reference numerals.

Figure 1:
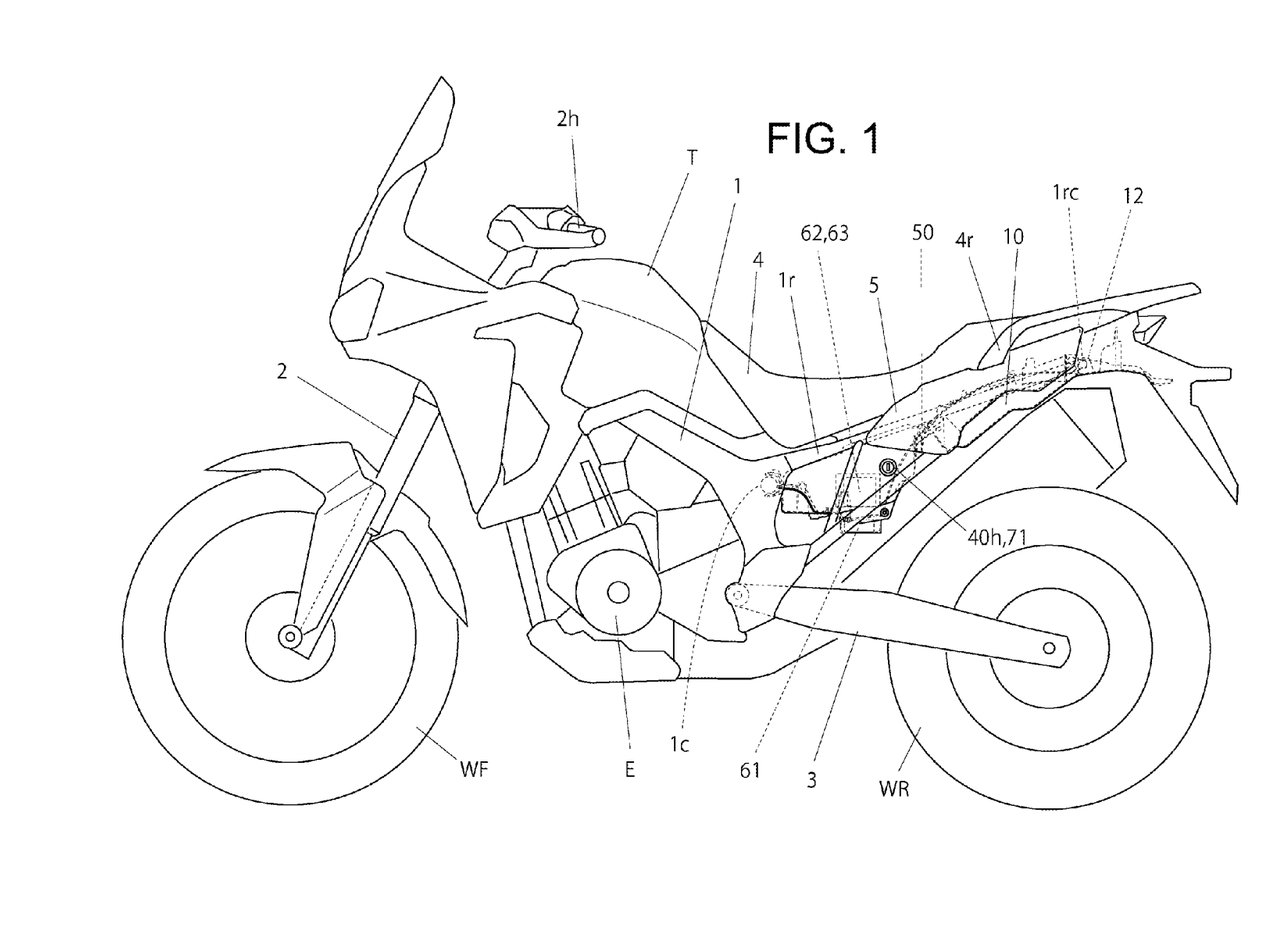
FIG. 1 is a side view of a motorcycle as an example of a vehicle employing an embodiment of a rear structure for a saddle-ride type vehicle according to the present invention.

A saddle-ride type vehicle illustrated in FIG. 1 is a motorcycle, and includes a rear fender 10 made of resin and covering an upper side of a rear wheel WR.

A front fork 2 is supported in a front portion of a vehicle-body frame 1 to be steerable by using a handle 2h, and a front wheel WF is supported in a front end of the front fork 2. A power unit (engine) E is suspended in the vehicle-body frame 1, and a rear wheel WR is driven by the power unit E. The rear wheel WR is swingably supported to the vehicle-body frame 1 by means of a swingarm 3. A fuel tank T is mounted on the vehicle-body frame 1, and a seat 4 for a rider to be seated is provided on a rear portion of the fuel tank T. The seat 4 is supported by seat rails 1r, which form a rear portion of the vehicle-body frame 1.

As illustrated in FIGS. 2 to 5, the rear fender 10 includes: a bottom portion 20 configured to face the rear wheel WR; first side portions 30 (L, R) extending upward integrally from left and right end portions of the bottom portion 20; and bending portions 40 (L, R) formed integrally with the bottom portion 20 to be bendable at hinge portions 41 provided therebetween.

Figures 3A, 3B:
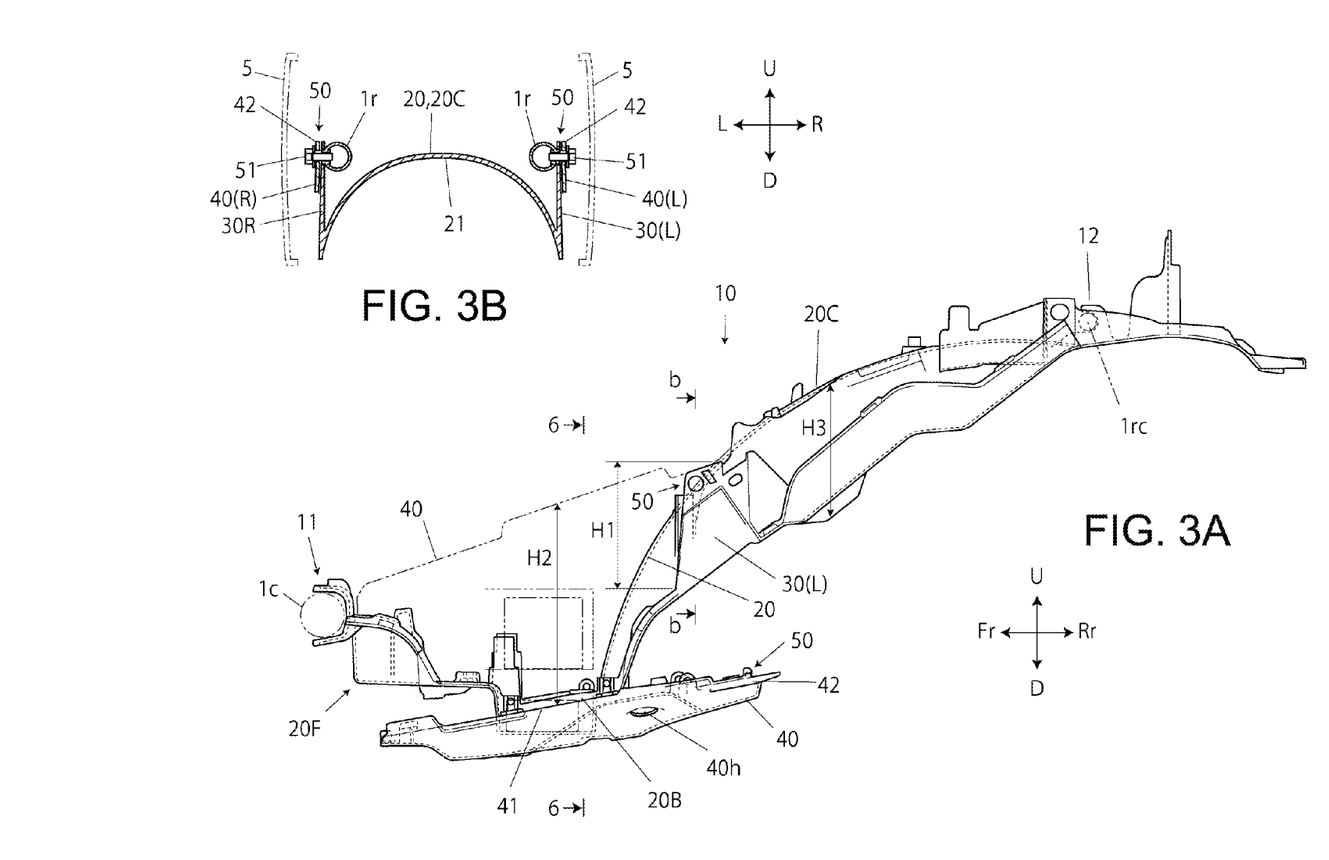
FIG. 3A is a side view of the rear fender and FIG. 3B is a cross-sectional view illustrating a state where a bending portion 40 is stood upright, and an end view taken along the line b-b in FIG. 3A.
Figure 5:
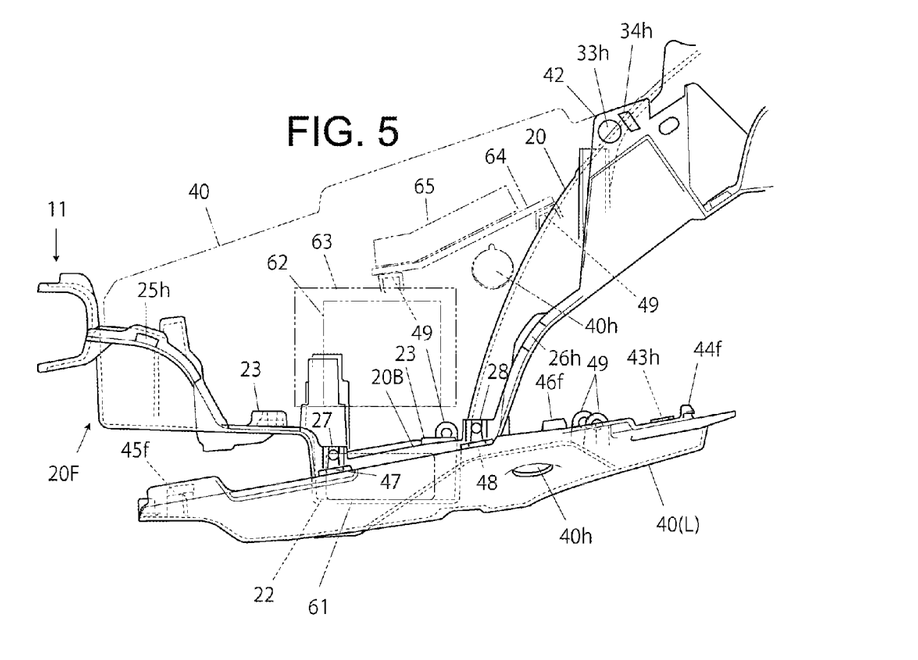
FIG. 5 is a partial enlarged view of FIG. 3A.

The bending portions 40 are bent and stood upright from the bottom portion 20 as indicated by imaginary lines in FIGS. 3A and 5, and joined to the first side portions 30 to form second side portions (40).

According to this rear structure for a saddle-ride type vehicle, since the second side portions 40 are formed by bending and standing the bending portions (40) from the bottom portion 20, and joining the bending portions (40) to the first side portions 30, there is no need to engage tip ends of the bending portions (40) with the bottom portion 20.

Therefore, this makes it possible to effectively utilize a space on the bottom portion 20 of the rear fender.

The bottom portion 20 of this embodiment includes: a curved portion 20C which has an arc shape in a side view to cover an upper side and a front side of the rear wheel WR and has a convex shape depressed upward in a cross-section seen from the front of the vehicle (FIG. 3B); a bottom plate portion 20B which extends frontward and slightly obliquely downward from a front lower end of the curved portion 20C, while facing the rear wheel WR; and a front plate portion 20F which extends frontward and slightly upward from the bottom plate portion 20B.

The bending portions (40) of this embodiment are not in engagement with any of the curved portion 20C, the bottom plate portion 20B, and the front plate portion 20F of the bottom portion 20, and it is thus possible to effectively utilize all the spaces on the curved portion 20C, the bottom plate portion 20B, and the front plate portion 20F.

As illustrated in FIG. 3A, a height H2 of the second side portions 40 extending upward from the hinge portions 41 is made larger than a height H1 of the first side portions 30, that is, H2>H1.

According to this structure, it is possible to manufacture the second side portions 40, which are portions higher than the bottom portion 20, in a state where the second side portions 40 are developed relative to the bottom portion 20 through the hinge portions 41 (see FIG. 2), and it is also possible to form the first side portions 30, which are portions lower than the bottom portion 20, such that the first side portions 30 protrude upward from the bottom portion 20. This makes it possible to reduce the size of a manufacturing device.

As illustrated in FIG. 3B, the bottom portion 20 includes a recess portion 21 depressed upward along an outer shape of the rear wheel. The height H1 of the first side portions 30 is smaller than or equal to a maximum height H3 of the recess portion 21 (FIG. 3A), that is, H1≤H3.

According to this structure, it is possible to avoid an increase in the size of a forming mold.

As illustrated in FIGS. 3A and 3B, a joint portion 50 where each first side portion 30 and the corresponding second side portion 40 are joined together is formed by partially overlapping the first side portion 30 and the second side portion 40 in a vehicle-width direction (a left-right direction in FIG. 3B). The joint portion 50 is covered with a cover member 5 from an outer side in the vehicle-width direction as illustrated also in FIG. 1.

According to this structure, it is possible to prevent water and the like from entering through the joint portions 50 while simplifying the structure of the joint portions 50.

The illustrated cover members 5 are rear side covers which cover sides of the rear fender 10 below the seat 4 and grab rails 4r.

As illustrated in FIG. 3B, an upper portion 42 of each second side portion 40 is fastened and fixed together with the first side portion 30 to the vehicle-body frame 1 (the seat rail 1r in this embodiment) by a fastening member 51.

According to this structure, it is possible to reliably prevent the first side portions 30 and the second side portions 40 from inclining relative to the bottom portion 20 (inclining in the left-right direction in FIG. 3B).

Figures 4A, 4B:
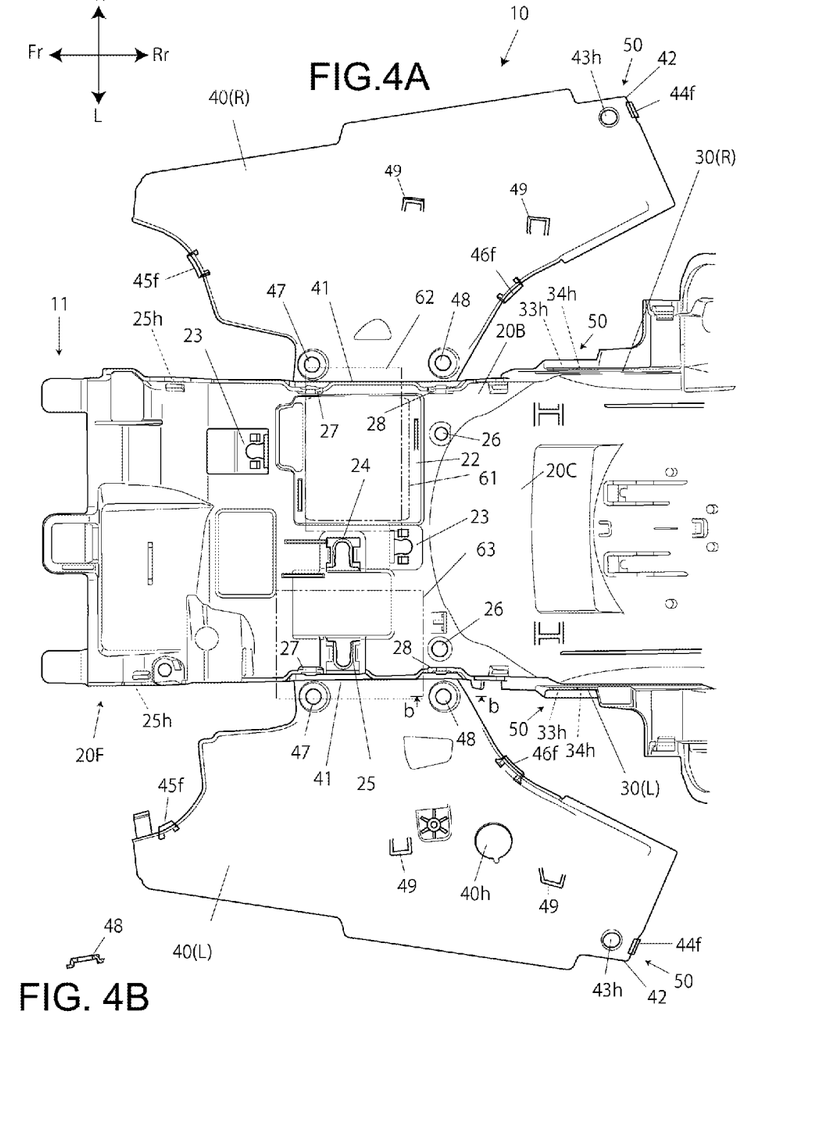
FIG. 4A is a partial enlarged view of FIG. 2.
FIG. 4B is a cross-sectional view taken along the line b-b in FIG. 4A.

In FIGS. 4 and 5, reference numeral 33h denotes insertion holes provided in the first side portions 30 for the fastening members 51; and 43h denotes insertion holes provided in the second side portions 40 for the fastening members 51.

Reference numeral 44f denotes engaging claws provided near the insertion holes 43h, and the engaging claws 44f engage with engaging holes 34h provided in the first side portions 30 near the insertion holes 33h.

Further, as illustrated in FIGS. 4A and 5, in this embodiment, engaging claws 45f, 46f are provided on the front and rear sides of each second side portion 40, and engaging holes 25h, 26h, which engage with the engaging claws 45f, 46f, are provided in each lateral side portion of the bottom portion 20. In addition, fastening portions (holes for fastening members) 47, 48 are provided in front and rear sides of a bottom portion of each second side portion 40, and fastening portions 27, 28, which are fastened to these fastening portions 47, 48, are provided in the bottom portion 20 (20B). Clip nuts (not illustrated) are attached on the fastening portions 27, 28 on the bottom portion side, and bolts are connected to the clip nuts from the outer side of each second side portion 40 stood upright, so that the lower portion of the second side portion 40 is fastened and fixed to the bottom portion 20.

In this way, the second side portions 40 of this embodiment are fixed to the bottom portion 20 not only by the joint portions 50 but also by the joining of the engaging claws 45f, 46f and the engaging holes 25h, 26h, as well as the joining of the fastening portions 47, 48 and the fastening portions 27, 28. This makes it possible to reliably prevent the second side portions 40 from inclining relative to the bottom portion 20.

Figure 6:
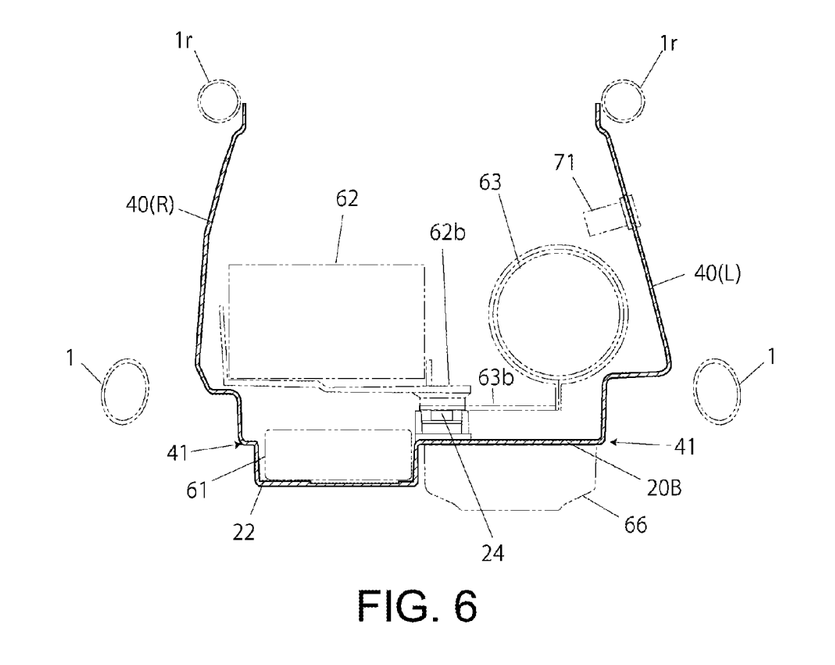
FIG. 6 is a cross-sectional view illustrating a state where the bending portion 40 is stood upright, and an end view taken along the line b-b in FIG. 3A; and, FIG. 7 is a schematic configuration view of a lock mechanism for a seat.

As illustrated in FIGS. 4A, 5, and 6, electrical components (61, 62) are fixed to the bottom portion 20 near the hinge portions 41.

According to this structure, since the electrical components (61, 62) are fixed to the bottom portion 20 near the hinge portions 41, which are at lower positions in the rear fender 10, it is possible to lower the center of gravity of the vehicle (see FIG. 1).

Reference numeral 61 denotes a turn signal relay, which is disposed in a housing recess portion 22 depressed downward in the bottom portion 20; 62 denotes an ABS unit disposed on an upper portion of the turn signal relay 61; 63 denotes a canister disposed to the left of the ABS unit 62; 23, 23 denote ABS unit attachment portions; 24 denotes an attachment portion for the ABS unit and the canister; and 25 denotes a canister attachment portion.

An opening is provided in a front side of the housing recess portion 22 for the turn signal relay 61, and a coupler (not illustrated) is connected to the turn signal relay 61 through the opening.

Reference numerals 26, 26 denote fender supporting portions.

Reference numeral 49 denotes attachment portions for an ETC tray 64 (FIG. 5), one attachment portion 49 is provided in each of the front and rear sides of each of the left and right second side portions 40, so that four attachment portions 49 are provided in total. An ETC unit 65 is mounted on the ETC tray 64.

In FIG. 6, reference numeral 62b is an attachment bracket for the ABS unit; and 63b denotes an attachment bracket for the canister.

Reference numeral 66 denotes a regulator attached on a bottom face of the bottom plate portion 20B.

As illustrated in FIG. 1, the rear fender 10 is disposed below the seat 4 for the rider to be seated. A through-hole 40h (see FIGS. 4A and 5) configured to connect an inside and an outside of the rear fender 10 is provided in one of the second side portions 40. A key cylinder 71 (FIGS. 1 and 6) constituting a part of a lock mechanism 70 (FIG. 7) for the seat 4 is inserted through the through-hole 40h.

According to this structure, it is possible to form the through-hole 40h for the key cylinder 71 simultaneously when manufacturing the rear fender 10 without using a special mold.

Figure 7:
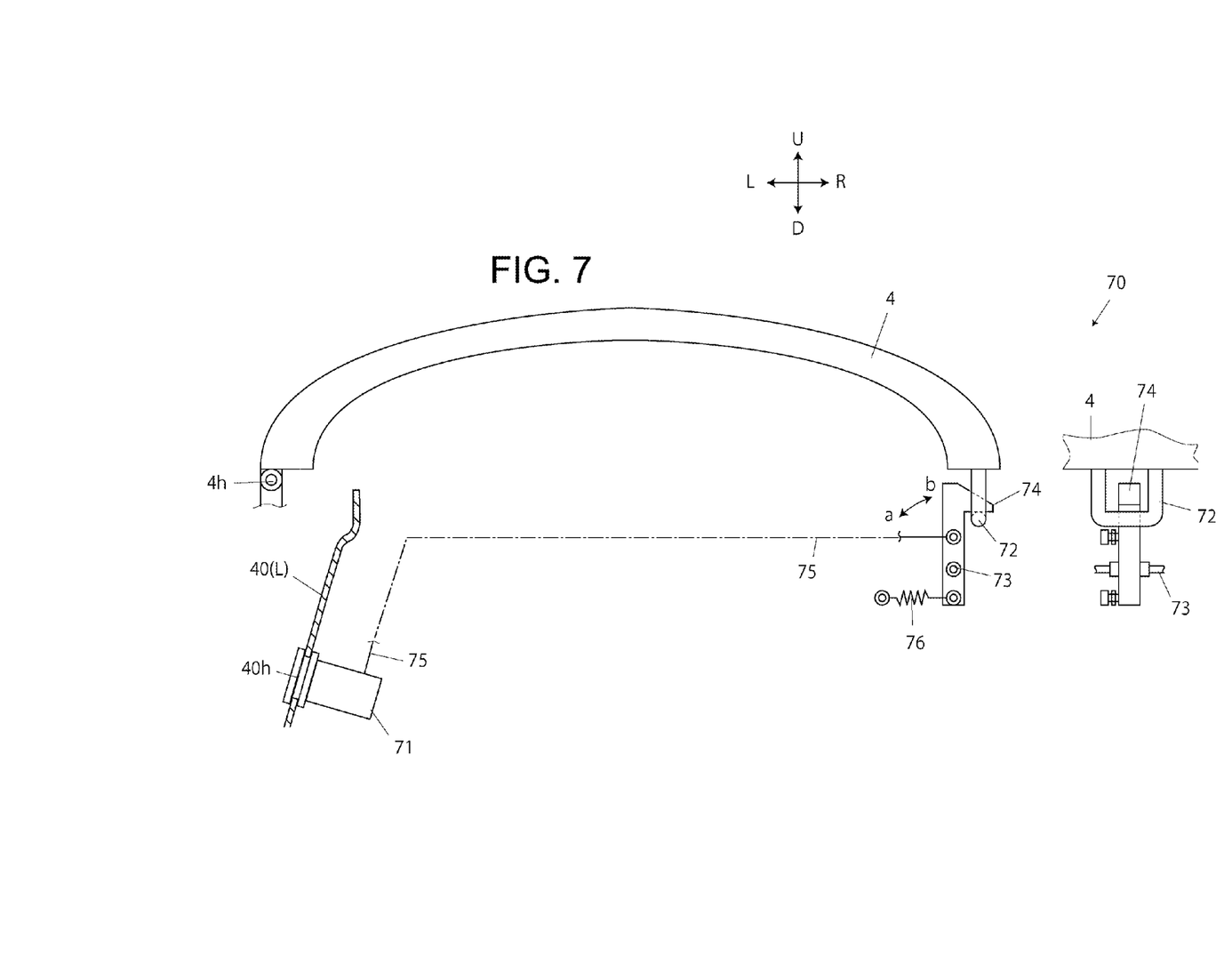

As the lock mechanism 70, a publicly known mechanism may be employed. For example, the basic configuration thereof may be as illustrated in FIG. 7. Specifically, the seat 4 is made openable and closable at a hinge 4h, and an engaging member 72 is fixed to the seat 4 on the opposite side to the hinge 4h, and hook 74, which is attached to a vehicle body to be turnable about a shaft 73, is provided to be engageable with and disengageable from the engaging member 72. A return spring 76 is provided between the hook 74 and the vehicle body, and the hook 74 and the key cylinder 71 are co-operatively connected by a wire 75, such that the hook 74 is turned to an unlocking side (in the direction of an arrow a) by operating the key cylinder 71 using a key (not illustrated), and after the operation, the hook 74 is returned to a locking side (in the direction of an arrow b) by the action of the return spring 76.

Figure 2:
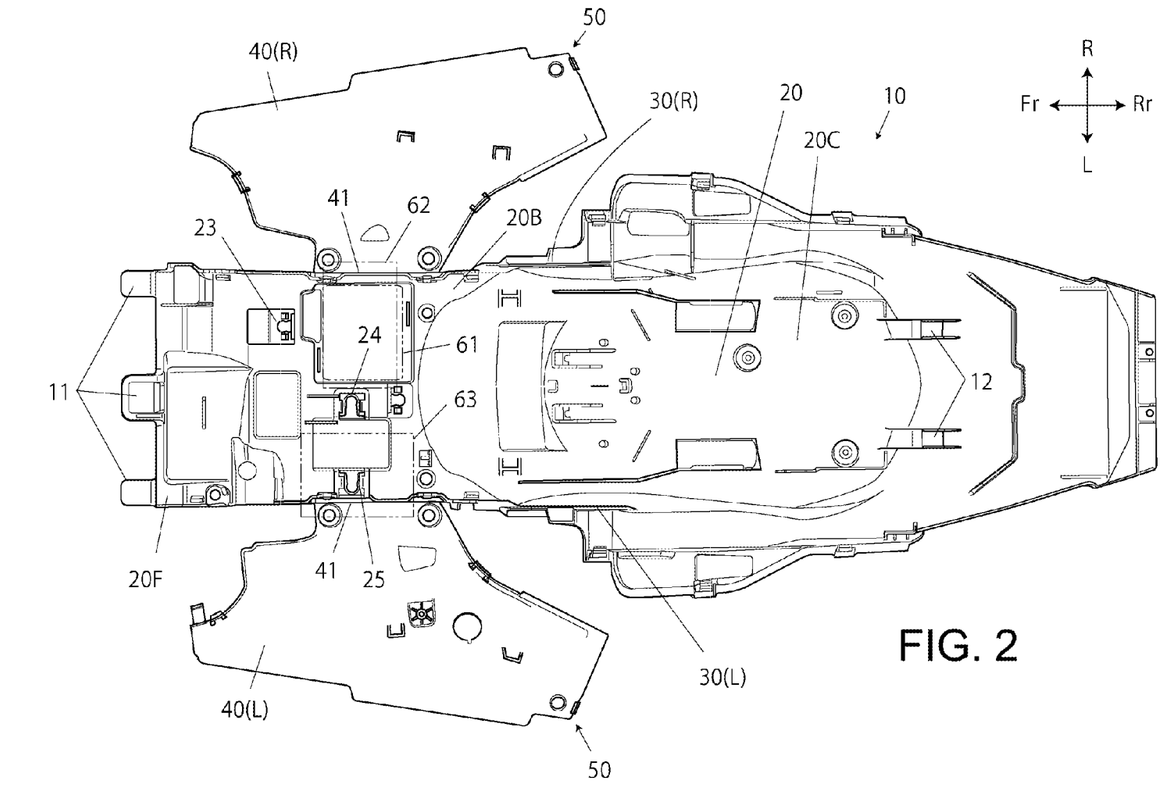
FIG. 2 is a plan view of a rear fender.

As illustrated in FIGS. 2 and 3A, the rear fender 10 is provided in a front portion thereof with hanging portions 11 for a cross member 1c of the vehicle-body frame 1 and in a rear portion thereof with hanging portions 12 for a cross member 1rc in a rear portion of the seat rails 1r.

As illustrated in FIGS. 1 and 3A, the rear fender 10 is attached to the vehicle-body frame 1 by hanging the hanging portions 11 in the front portion onto the cross member 1c and hanging the hanging portions 12 in the rear portion onto the cross member 1rc, and then fastening and fixing the upper portion 42 of each second side portion 40 to the seat rail 1r together with the first side portion 30 with the fastening member 51.

Although the embodiment of the present invention has been described so far, the present invention is not limited to the above-described embodiment, and modifications may be made as appropriate within the scope of the present invention.

LIST OF THE REFERENCE NUMERALS

1 VEHICLE-BODY FRAME
4 SEAT

5 COVER MEMBER
WR REAR WHEEL
10 REAR FENDER
20 BOTTOM PORTION
21 RECESS PORTION
30 FIRST SIDE PORTION
40 SECOND SIDE PORTION (BENDING PORTION)
40h THROUGH-HOLE
41 HINGE PORTION
42 UPPER PORTION
50 JOINT PORTION
51 FASTENING MEMBER
61, 62 ELECTRICAL COMPONENT
70 LOCK MECHANISM
71 KEY CYLINDER

What is claimed is:

1. A rear structure for a saddle-ride type vehicle, comprising a rear fender made of resin and configured to cover an upper side of a rear wheel of a saddle-ride type vehicle, wherein
the rear fender includes:
a bottom portion configured to face the rear wheel;
a first side portion extending upward integrally from each of left and right end portions of the bottom portion; and
a bending portion formed integrally with the bottom portion to be bendable at a hinge portion provided therebetween, and configured to be bent and stood upright from the bottom portion, and to be joined to the first side portion to form a second side portion.

2. The rear structure for a saddle-ride type vehicle, according to claim 1, wherein
a height of the second side portion extending upward from the hinge portion is larger than a height of the first side portion.

3. The rear structure for a saddle-ride type vehicle, according to claim 2, wherein
an electrical component is fixed to the bottom portion near the hinge portion.

4. The rear structure for a saddle-ride type vehicle, according to claim 2, wherein
the bottom portion includes a recess portion depressed upward along an outer shape of the rear wheel, and
a height of the first side portion is smaller than or equal to a maximum height of the recess portion.

5. The rear structure for a saddle-ride type vehicle, according to claim 2, wherein
a joint portion where the first side portion and the second side portion are joined together is formed by partially overlapping the first side portion and the second side portion in a vehicle-width direction, and
the joint portion is covered with a cover member from an outer side in the vehicle-width direction.

6. The rear structure for a saddle-ride type vehicle, according to claim 2, wherein
an upper portion of the second side portion is fastened and fixed together with the first side portion to a vehicle-body frame by a fastening member.

7. The rear structure for a saddle-ride type vehicle, according to claim 2, wherein
the rear fender is disposed below a seat for a rider to be seated,
a through-hole configured to connect an inside and an outside of the rear fender is provided in the second side portion, and
a key cylinder constituting a part of a lock mechanism for the seat is inserted through the through-hole.

8. The rear structure for a saddle-ride type vehicle, according to claim 1, wherein
the bottom portion includes a recess portion depressed upward along an outer shape of the rear wheel, and
a height of the first side portion is smaller than or equal to a maximum height of the recess portion.

9. The rear structure for a saddle-ride type vehicle, according to claim 8, wherein
a joint portion where the first side portion and the second side portion are joined together is formed by partially overlapping the first side portion and the second side portion in a vehicle-width direction, and
the joint portion is covered with a cover member from an outer side in the vehicle-width direction.

10. The rear structure for a saddle-ride type vehicle, according to claim 8, wherein
an upper portion of the second side portion is fastened and fixed together with the first side portion to a vehicle-body frame by a fastening member.

11. The rear structure for a saddle-ride type vehicle, according to claim 8, wherein
an electrical component is fixed to the bottom portion near the hinge portion.

12. The rear structure for a saddle-ride type vehicle, according to claim 8, wherein
the rear fender is disposed below a seat for a rider to be seated,
a through-hole configured to connect an inside and an outside of the rear fender is provided in the second side portion, and
a key cylinder constituting a part of a lock mechanism for the seat is inserted through the through-hole.

13. The rear structure for a saddle-ride type vehicle, according to claim 1, wherein
a joint portion where the first side portion and the second side portion are joined together is formed by partially overlapping the first side portion and the second side portion in a vehicle-width direction, and
the joint portion is covered with a cover member from an outer side in the vehicle-width direction.

14. The rear structure for a saddle-ride type vehicle, according to claim 13, wherein
an upper portion of the second side portion is fastened and fixed together with the first side portion to a vehicle-body frame by a fastening member.

15. The rear structure for a saddle-ride type vehicle, according to claim 13, wherein
an electrical component is fixed to the bottom portion near the hinge portion.

16. The rear structure for a saddle-ride type vehicle, according to claim 13, wherein
the rear fender is disposed below a seat for a rider to be seated,
a through-hole configured to connect an inside and an outside of the rear fender is provided in the second side portion, and
a key cylinder constituting a part of a lock mechanism for the seat is inserted through the through-hole.

17. The rear structure for a saddle-ride type vehicle, according to claim 1, wherein
an upper portion of the second side portion is fastened and fixed together with the first side portion to a vehicle-body frame by a fastening member.

18. The rear structure for a saddle-ride type vehicle, according to claim 17, wherein
an electrical component is fixed to the bottom portion near the hinge portion.

19. The rear structure for a saddle-ride type vehicle, according to claim 17, wherein
- the rear fender is disposed below a seat for a rider to be seated,
- a through-hole configured to connect an inside and an outside of the rear fender is provided in the second side portion, and
- a key cylinder constituting a part of a lock mechanism for the seat is inserted through the through-hole.

20. The rear structure for a saddle-ride type vehicle, according to claim 1, wherein
- the rear fender is disposed below a seat for a rider to be seated,
- a through-hole configured to connect an inside and an outside of the rear fender is provided in the second side portion, and
- a key cylinder constituting a part of a lock mechanism for the seat is inserted through the through-hole.

\* \* \* \* \*